R. L. SWANSON.
FLUID TRANSMISSION MECHANISM.
APPLICATION FILED MAY 8, 1918.

1,349,924.

Patented Aug. 17, 1920.
2 SHEETS—SHEET 2.

Inventor
R. L. Swanson

Witness
Paul M. Evant
L. B. Middleton

By Victor J. Evans
Attorney

UNITED STATES PATENT OFFICE.

ROBERT L. SWANSON, OF RED BLUFF, CALIFORNIA.

FLUID-TRANSMISSION MECHANISM.

1,349,924.  Specification of Letters Patent.  Patented Aug. 17, 1920.

Application filed May 8, 1918. Serial No. 233,337.

*To all whom it may concern:*

Be it known that I, ROBERT L. SWANSON, a citizen of the United States, residing at Red Bluff, in the county of Tehama and State of California, have invented new and useful Improvements in Fluid-Transmission Mechanism, of which the following is a specification.

This invention is a fluid transmission mechanism.

The principal objects of this invention are to provide a series of different sized fluid pressure motors mounted on a single shaft, a valve for controlling the flow of the fluid under pressure to each one of the motors at will, a plurality of valves to change the direction of fluid flow, a pump operatively connected to a prime mover to produce a pressure fluid flow, means to operatively connect the two valves for simultaneous operation, and piping to connect the valve elements together.

In the preferred embodiment of the invention:—

Any suitable form of prime mover may be used, such as the gas engine 5, which may be connected in any desired manner to the rotary pump 6. The inlet and outlet parts of this pump 6 are connected by suitable piping with the valves 7. In this piping connecting the pump with the valves are suitable tubes 8, which are closed by means of plugs, the removal of which will permit fluid to be introduced into the system.

Figure 1:
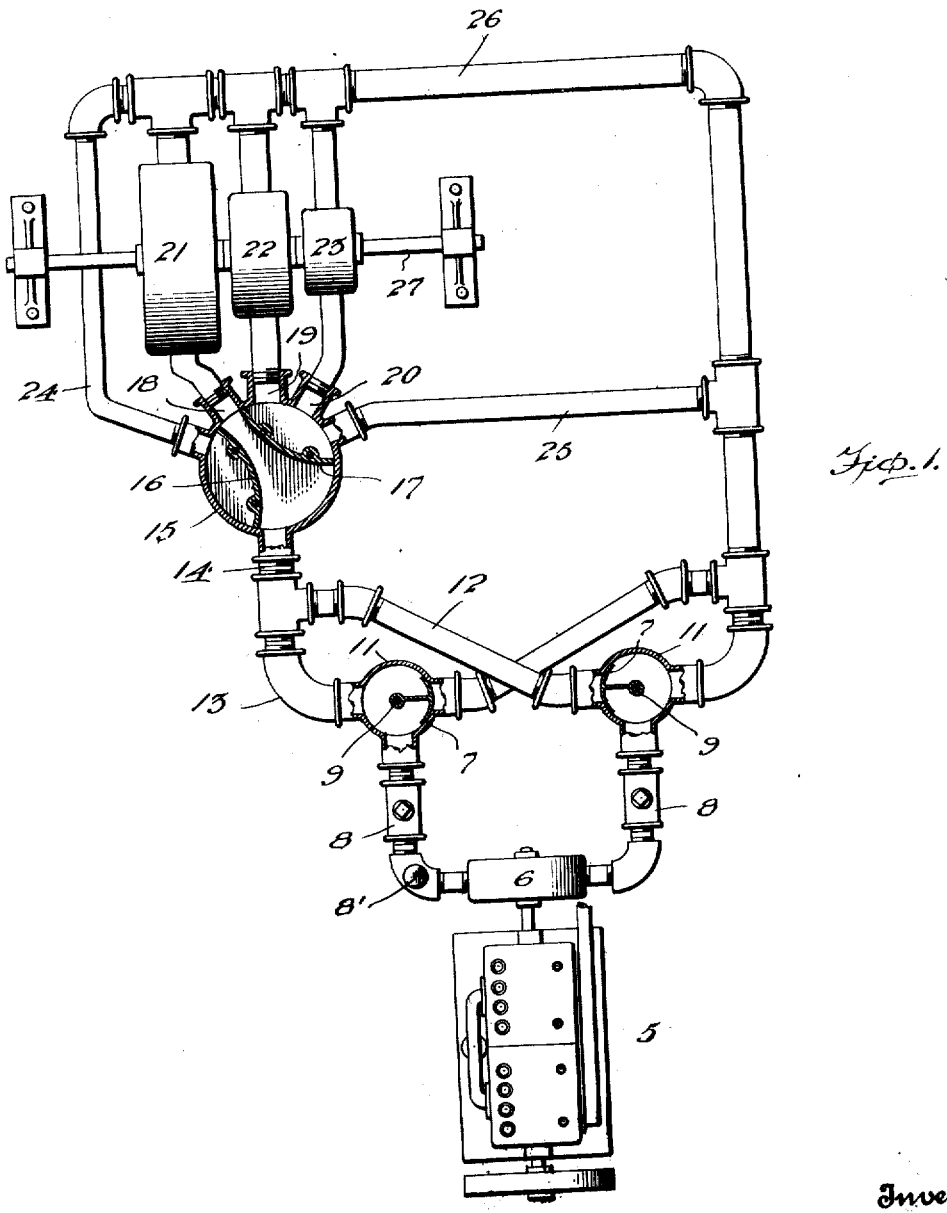
Figure 1 is a top plan view partly in section.
Figure 2:
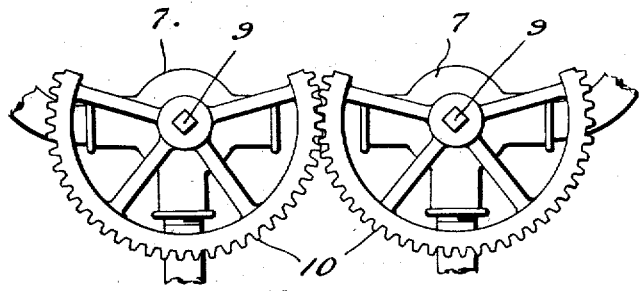
Fig. 2 is a plan view of the sectors connected with the valves for changing the direction of fluid flow.
Figure 3:
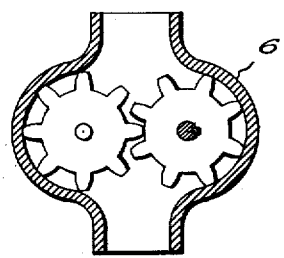
Fig. 3 is a sectional view of a conventional rotary pump.
Figure 4:
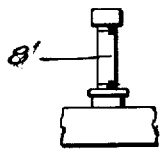
Fig. 4 is a detail view showing an air cushion.

The valves 7 are preferably provided with three-way openings, as shown in Fig. 1, and mounted upon the valve stem 9 are the sectors 10. The valve body 11 of each of the valves 7 is provided with three outlets, one of which comes from the pump 6 direct, another one leading and connected to another part of the piping system, which is used for the normal operation and direction of the fluid flow, and the other outlet being connected to the return side of the piping. The leads connecting the valves with the normal direction of the flow piping will be designated by the numerals 12 and 13.

The pipe 14 is connected to the valve body 15 in any suitable manner. Disposed within the valve body 15 is a valve having wings 16 and 17. These wings are so arranged as to permit the flow of fluid from the pipe 14 across the valve 15 and the wings at one end, and are separated for a distance approximating one-third of the circumference, while the opposite side or ends of the wings are of sufficient width to coöperate with the inlet openings 18, 19, and 20 leading to the fluid pressure motors 21, 22, and 23.

Also connected with the valve body 15 are the by-pass tubes 24 and 25, which are connected with a piping 26 leading to one side of the fluid motors 21, 22 and 23. The fluid pressure motors 21, 22 and 23 are shown in Fig. 1 as being of different diameters, and they are mounted and secured to a shaft 27 in any well-known manner. These motors may be of any usual type or construction, no particular type being shown, other than that known as the rotary.

By having motors of different diameters that are adapted to rotate at different speeds at the same pressure, the torque is consequently varied according to the diameters. If it is desired to have a large starting torque, one of the motors may be used, and when the shaft is started rotating and it is desired to increase the speed, another motor may be connected and the first one cut out, and if still higher speeds are desired, the other and last motor may be cut in and the two motors cut out.

In practical operation, the system may be filled with some transmission fluid which may also contain lubricating qualities so that the several operative parts will not dry and depend upon exterior lubrication. The prime mover 5' is turned over and it is thought for economical reasons being a gas engine that it should run at a constant speed, and will, therefore, operate the pump 6 producing a fluid pressure flow having a constant velocity. Of course, the engine may be run at different speeds in order to vary the velocity if so desired. The fluid in passing from the pump flows through the valve 7, thence into the pipe 14, where it enters the valve body 15. As shown in Fig. 1, the wings 16 and 17 are so positioned that the fluid will flow from the pipe 14 to the inlet 18 of the fluid pressure motor 21. The fluid after passing through this motor will pass into the pipe 26 and also into the by-pass pipes 24 and 25. The fluid will also pass through the idling motors 22 and 23. In passing through they will tend to reduce the power consumption, as these two motors will not have their rotors operating through a slow moving fluid.

The valves 7, which are operatively connected by means of the toothed sectors 10, are used for reversing the direction of fluid flow to the motors 21, 22, and 23.

When necessary cushioning devices may be provided for taking up any sudden or severe pressures in the line. One of these devices is shown at 8' and consists of an upright pipe having its end closed and having a certain quantity of air therein. Thus any sudden pressure in the system will be cushioned by the air in said pipe. It will of course be understood that drain cocks may be located at any desired position in the system.

It will be noticed from the construction illustrated, that the device is capable of a quick acceleration up to full speed, as there are no gears to shift and the acceleration is gradual, and may be accomplished at will. It may be used in work-shops as well as upon a motor driven vehicle. The manner of assembling and connecting the various parts of the piping system together with the fluid pressure motors, the valves and the pump will be that such as is usual in the trade.

Minor changes in the proportions and details of construction may be resorted to without departing from the spirit of my invention or the scope of the appended claims.

I claim:

1. An apparatus of the class described, comprising a series of separated motors, of different sizes, a shaft common to all the motors, a valve casing, a pipe connecting the same with each motor, a pump, an inlet pipe connecting the same to the valve casing, a valve in said casing having its inlet end of sufficient size to permit it to remain in register with the inlet pipe while its outlet end is moved to register with any of the pipes leading to the motors, means for returning the fluid to the pump after it leaves the motor and means associated with the last mentioned means for permitting the fluid to pass through the idling motors.

2. An apparatus of the class described, comprising a series of separated motors of different sizes, a shaft common to all the motors, a valve casing, a pipe connecting the same with each of the motors, a pump, a pipe connecting the same with the valve casing, a return pipe connected with the pump, a pipe connecting each of the motors with the return pipe, by-pass pipes connecting the return pipe with the valve casing and a valve in said casing having its inlet end enlarged and its outlet end restricted to the size of the pipes leading to the motors so that the valve will remain in communication with the pipe leading from the pump while its outlet end is registering with any of the motor pipes, said by-pass pipes permitting the fluid to circulate through the idling motors.

In testimony whereof I affix my signature.

ROBERT L. SWANSON.